June 4, 1929.  H. H. WILSON  1,716,200
DAMPER REGULATOR FOR BOILERS
Filed July 20, 1927
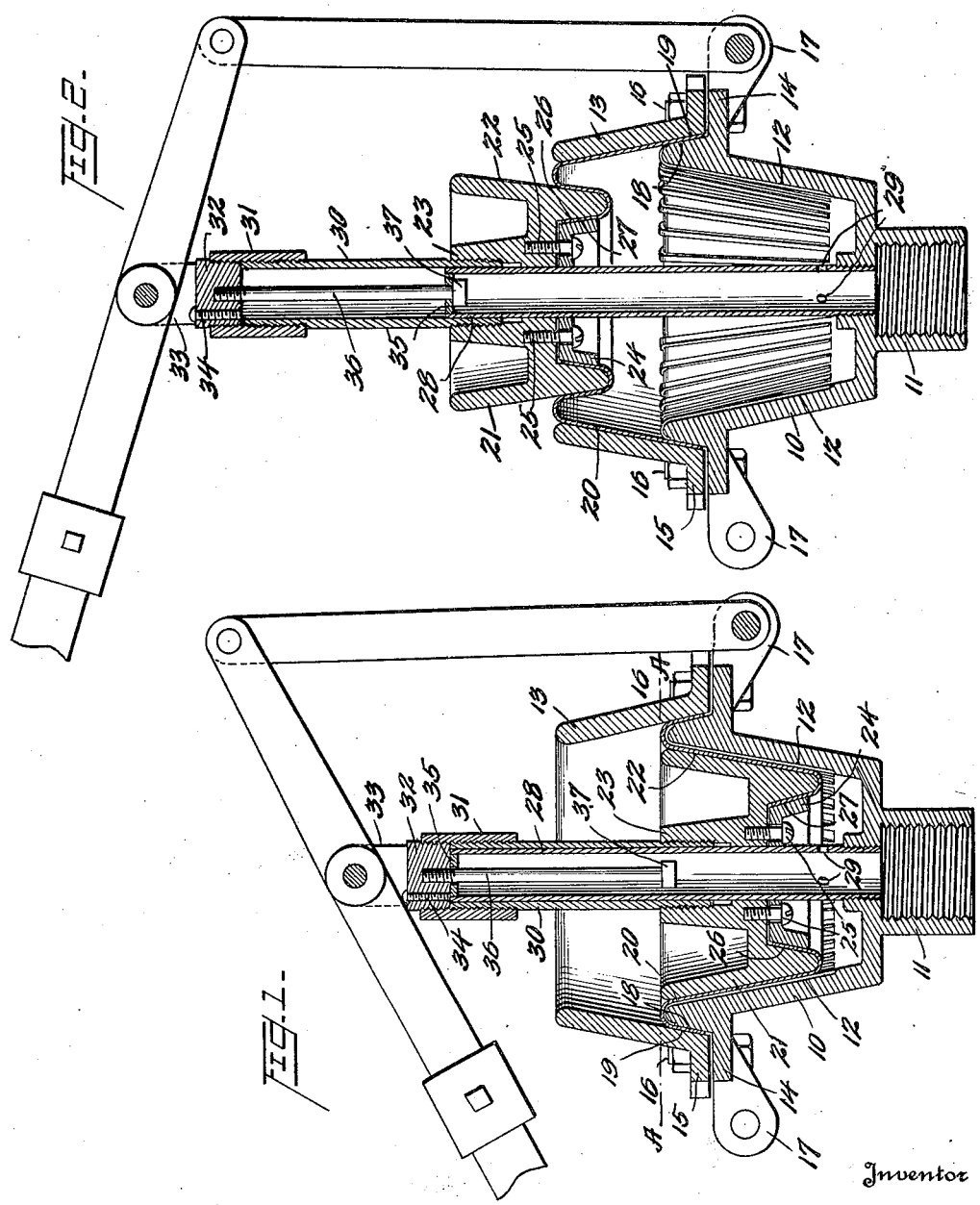
Inventor
Hurley H. Wilson
By Wm. D. Shoemaker
Attorney Patented June 4, 1929.

1,716,200

UNITED STATES PATENT OFFICE.

HURLEY H. WILSON, OF HARRISBURG, PENNSYLVANIA, ASSIGNOR TO FUEL SAVERS, INCORPORATED, OF HARRISBURG, PENNSYLVANIA, A CORPORATION OF PENNSYLVANIA.

DAMPER REGULATOR FOR BOILERS.

Application filed July 20, 1927. Serial No. 207,296.

This invention relates to a damper regulator for boilers, and more particularly to the improvement of the pressure responsive element of such a regulator as applied to a steam heating apparatus.

The object of the invention is the production of a pressure responsive element, which will readily operate at a predetermined pressure, and continue only upon successive increases of pressure, thereby producing a steady plunger movement as the pressure increases. This may be denominated a differential or incremental movement.

Another object of the invention is the production of a device of this kind having a comparative long range of movement.

Other objects and advantages of the invention will hereinafter appear and the novel features thereof will be particularly pointed out in the appended claims.

Like letters of reference indicate like parts throughout the drawings, in which

Figure 1 is a sectional view with the regulator plunger at its lowest position, and Figure 2 is a similar view showing the plunger in its raised position.

While the invention is described in connection with a damper regulator for a boiler of a steam heating plant, it will be understood that this use is only indicative and that it may be just as useful in other places where similar problems arise, as for instance, in an expansion joint in a pipe line, or other device where a movement of one part of a vessel containing pressure is desired with reference to a stationary part of the vessel, or in reducing pressure valves where incremental or differential movement with reference to pressure is desired.

The pressure responsive element may be described as consisting of a casing, a plunger, and guides for the plunger. These parts will now be described in detail and their individual functions pointed out, after which a recital of their conjoint use will be given.

The casing 10 has a substantially cup shaped body to receive the plunger, and is provided with a depending nipple 11, by means of which the casing may be attached to a boiler (not shown) or the like. The casing body is interiorly supplied with grooves 12 to permit fluid pressure to be exerted upon the plunger to the top of the casing body.

Above the casing body is a collar 13 having the form of a truncated cone. The casing body and collar are provided with flanges 14 and 15, respectively, for the purpose of uniting these two parts, as by bolts 16. Eyes 17 are provided on the body for the attachment of parts thereto.

The abutting lower portion of the collar and the upper portion of the casing body are provided with clamping faces 18 and 19 for securing one end of a diaphragm 20 of rubber or other flexible material made in the form of a truncated cone, the smaller end of the diaphragm being clamped to the plunger as will be explained.

The plunger 21 has the general form of a truncated cone with its outer face 22 conforming to the inner face of the casing body. The plunger is provided with a nipple 23 and with a clamping element 24 secured to the plunger by means of the screws 25. Between the conical faces 26 and 27 of the lower end of the plunger and the clamping element or nut, is secured the smaller end of the diaphragm.

Rising from the bottom of the casing body is the hollow standard 28, in the lower end of which is provided one or more apertures 29 for the purpose of admitting fluid pressure within the casing body under the plunger 21. A sleeve 30 is mounted upon the standard, and is screwed into the nipple 23 of the plunger. At its upper end the sleeve 30 carries a coupling 31. This coupling holds the plug 32 to the sleeve 30. The pivot eyelet 33 is formed as a part of the plug 32, and the screw 34 is a vent to allow the escape of air, so that the body of the device may be filled with fluid forced in through the connection 11. In the upper end of the standard 28 is the perforated disk 35, through which the limit rod 36 passes, it being screwed into the plug 32 and provided with a head 37.

It will be appreciated that the standard 28 and the sleeve 30 act as an extensible support for the plunger 21, which is thereby guided in its vertical movement. Referring to Figure 1 it will be noted that the weight of the plunger when in its lowermost position is sustained by the standard 28, by reason of the plug 32 resting upon the upper end of the standard. Referring to Figure 2, it will be noted that the upper limit of movement of the plunger is determined by the bolt head 37 coming into contact with the disk 35.

From the foregoing description the individual functions of the several parts will be apparent. A recital of their conjoint use will now be given. Fluid pressure admitted through the nipple 11 is exerted against the disk 35 and through the apertures 29 against the lower face of the plunger 21 and diaphragm 20. For this purpose the plunger and the diaphragm may be considered as a piston operating within the casing. The grooves 12 permit the fluid pressure to be exerted upon the under face of the diaphragm, and the effective pressure area of the piston will be substantially that of a circle of the collar 13 at the upper edge of the casing body, as indicated by the line A—A on the drawing.

The parts are shown in Figure 1 as inactive, when the diaphragm lies with its major portion against the outer face of the plunger and slightly away from the inner face of the casing body, in a position ready to respond to fluid pressure in the casing. As the fluid pressure within the casing increases, a point will be reached when the plunger will rise. Due to the conical shape of the collar 13, the effective pressure area of the piston will decrease as the plunger rises, so that it will require compensating increases in the fluid pressure in the casing to continue the upward movement of the plunger. The effective pressure area at any position of the plunger will be that cross sectional area of the collar at the height of the diaphragm bend at that point. It will be appreciated that in the upward movement of the plunger due to the increases of fluid pressure under it, the diaphragm flexes or rolls from the outer conical surface of the plunger to the inner conical surface of the collar, the diaphragm being turned inside out during this movement. In the position shown in Figure 2, the plunger will have closed the damper or other element which it is designed to operate.

It is obvious that the movement of the plunger from its position shown in Figure 2 to that shown in Figure 1 will take place steadily as the fluid pressure decreases in the casing, and the operation of the parts will be simply the reverse of that occurring as the plunger rose.

It will be appreciated that by the construction of parts described, a large range of piston movement can be obtained, which can be employed in the more effective operation of a damper or other element. A decrease in the effective pressure area is secured as the piston operates, which produces what might be called a differential or incremental movement, resulting in the plunger taking a definite position for each definite fluid pressure throughout a given range of fluid pressures. For instance, if one pound fluid pressure will start the piston in its upward movement, it will only move it a short distance or until the effective pressure area of the piston is decreased; any further movement of the piston can only be secured through an increase in the fluid pressure within the casing. This variation in effective piston area is obtained by the diaphragm "rolling back" upon the inner conical surface of the collar, and cross sectional area of which becomes smaller as the piston rises. The production of this incremental or differential movement of the piston is of advantage in the regulation of a damper or the positioning of a valve, such as a reducing valve or the like.

Having described my invention, what I claim is:

1. In a pressure responsive device, a casing comprising a body portion adapted to be attached to a boiler or the like and comprising an outwardly flared wall and a standard projecting centrally upwardly from said body, a piston comprising an outer face flared corresponding to the flare of the body and mounted to move vertically upon said standard, a sleeve projecting upwardly from said piston and telescoping in the movement of the piston upon said standard, a collar attached to the upper portion of said body and inwardly flared, and a diaphragm, the body, collar and diaphragm defining a chamber in communication with the boiler and into which the piston moves.

2. The combination of claim 1 wherein the flared inner wall of the body is provided with ribs which are designed to space the piston from the body with the diaphragm therebetween.

3. The combination of claim 1 in which the body and the piston sleeve are provided with means for the attachment of links whereby the movement of the piston may be translated into a movement of an operating control.

In testimony whereof I affix my signature.

HURLEY H. WILSON.